H. S. SMITH.
Car-Couplings.
No. 156,440. Patented Nov. 3, 1874.
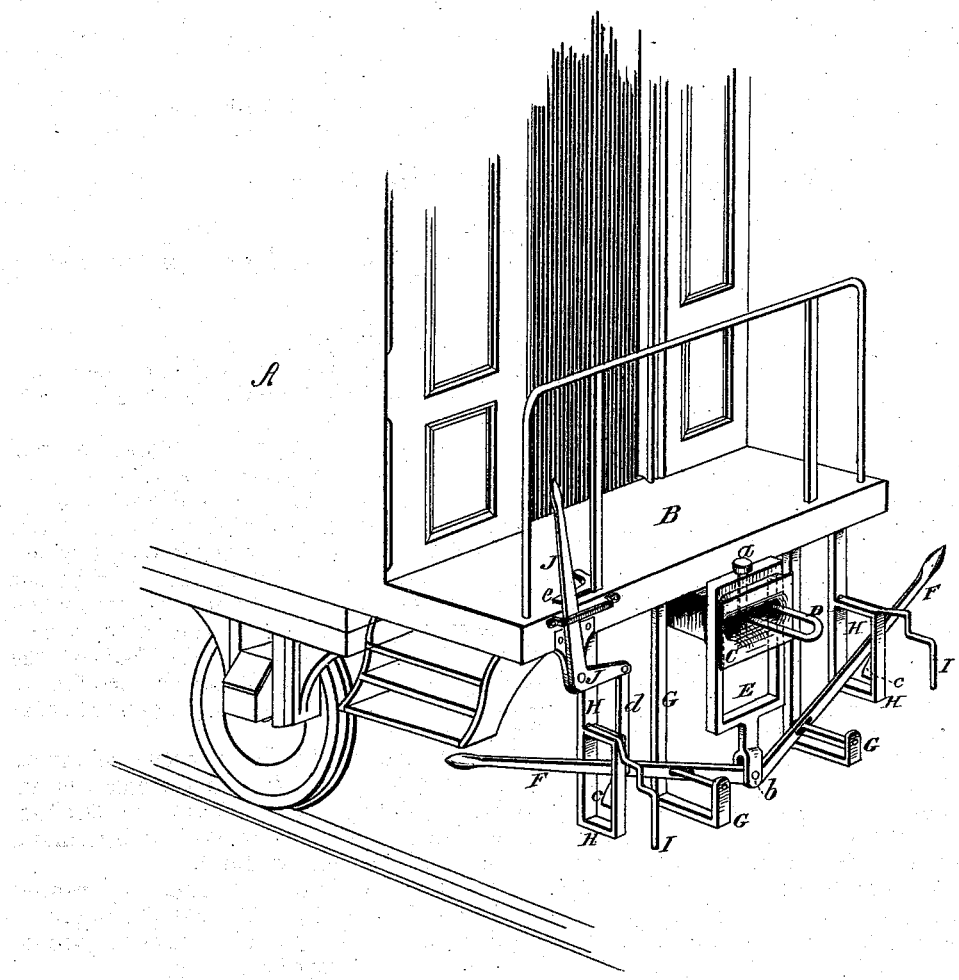
WITNESSES.
INVENTOR.

UNITED STATES PATENT OFFICE.

HARVEY S. SMITH, OF FRANCONIA, NEW HAMPSHIRE.

IMPROVEMENT IN CAR-COUPLINGS.

Specification forming part of Letters Patent No. 156,440, dated November 3, 1874; application filed August 15, 1874.

*To all whom it may concern:*

Be it known that I, HARVEY S. SMITH, of Franconia, in the county of Grafton and State of New Hampshire, have invented certain Improvements in Car-Couplings, of which the following is a specification:

My invention relates to devices for coupling cars; and consists in a novel construction, combination, and arrangement of parts, which have for their object to provide a simple and effective means by which the coupling-pin can be operated by hand, or automatically by the cars, as will be fully hereinafter set forth.

The drawing is a perspective view of a railway-car provided with my coupling device.

A is the body of the car; B, the platform; C, the draw-iron, and D the link. E is a gate or frame straddling the draw-iron, and capable of vertical reciprocation. $a$ is the coupling-pin, secured to the head of this frame and passing through holes in the draw-iron, as usual. The gate is reciprocated by the hand-levers F F, which are pivoted to the L-shaped hangers G G, depending from the platform. These levers are pin-jointed to the gate at $b$, and to allow of lateral play are slotted for the passage of the pin on which they turn, or they may be slotted at their ends where they are jointed to the gate E. The pins on which the levers turn are comparatively long to allow the levers to accommodate themselves to the movement of the draw-iron. H H are guards depending from the platform of the car, through which the levers F F pass. $c\ c$ are stops, formed on the inside of the guards to retain the levers when they are depressed. I I are rods, projecting outward from the guards H H and bent down, as shown, and are so situated in relation to the levers F F that, as the cars to be coupled come together, these wires on one car strike against the levers F F on the other car and trip them from under the catches $c\ c$, thus allowing the gate E and pin $a$ to fall.

These trippers I I are constructed of steel or other material, so as to have sufficient elasticity to obviate sudden jar and breakage.

For operating the levers from the platform, the bell-crank lever J, the short arm of which is connected with one of the levers F by the rod $d$, is used, and is retained in place when the gate is up by the catch $e$ on the platform, which can be operated by the foot of the brakeman, or by an automatic device for releasing the lever from the catch similar to that before described.

This device, unlike the majority of inventions to accomplish the same object, is exceedingly simple and not liable to derangement, while it is effective both in automatic action and operation by hand.

I am aware of Patent No. 102,149, granted to W. B. Parsons, April 19, 1870, for improvement in car-couplings, and I disclaim the invention therein described.

I claim—

1. The combination, with the draw-iron C and coupling-pin $a$, of the gate E and levers F F, hangers H, and catches $c\ c$, constructed to operate substantially as specified.

2. The combination, with the levers F F, of the trippers I I, constructed to operate substantially as specified.

3. The combination, with the draw-iron C and coupling-pin $a$, of the gate E, levers F F, lever J, and catch $e$, constructed to operate substantially as specified.

HARVEY S. SMITH.

Witnesses:
LIZZIE J. WATSON,
JOHN N. OAKES.